United States Patent
Suzuki

(10) Patent No.: US 7,436,557 B2
(45) Date of Patent: Oct. 14, 2008

(54) IMAGE READING SYSTEM, IMAGE READING METHOD AND PROGRAM FOR IMPLEMENTING THE METHOD

(75) Inventor: Nobukazu Suzuki, Kanagawa (JP)

(73) Assignee: Canon Kabushiki Kaisha (JP)

( * ) Notice: Subject to any disclaimer, the term of this patent is extended or adjusted under 35 U.S.C. 154(b) by 1016 days.

(21) Appl. No.: 10/924,011

(22) Filed: Aug. 23, 2004

(65) Prior Publication Data

US 2005/0052701 A1 Mar. 10, 2005

(30) Foreign Application Priority Data

Aug. 22, 2003 (JP) ............................. 2003-298912

(51) Int. Cl.
*H04N 1/04* (2006.01)
*H04N 1/46* (2006.01)

(52) U.S. Cl. ..................... 358/487; 358/506; 358/471

(58) Field of Classification Search ................ 358/1.18, 358/505, 506, 527, 474, 468, 471, 487, 479
See application file for complete search history.

(56) References Cited

U.S. PATENT DOCUMENTS

| | | | | |
|---|---|---|---|---|
| 4,282,160 A | * | 8/1981 | Foley | .......................... 552/111 |
| 5,329,362 A | * | 7/1994 | Takaiwa | ................... 348/228.1 |
| 5,751,343 A | | 5/1998 | Hibino et al. | |
| 5,995,204 A | * | 11/1999 | Hoshino et al. | ................. 355/75 |
| 6,434,339 B1 | * | 8/2002 | Saito et al. | .................... 396/311 |
| 6,762,863 B1 | | 7/2004 | Minakuti et al. | |
| 7,164,511 B2 | * | 1/2007 | Ford et al. | ................... 358/487 |
| 2003/0011827 A1 | | 1/2003 | Ford et al. | |
| 2004/0161145 A1 | * | 8/2004 | Embler | ........................ 382/165 |

FOREIGN PATENT DOCUMENTS

| | | |
|---|---|---|
| JP | 8-339438 A | 12/1996 |
| JP | 2000138793 * | 5/2000 |
| JP | 2001-144973 (A) | 5/2001 |

* cited by examiner

*Primary Examiner*—Jerome Grant, II
(74) *Attorney, Agent, or Firm*—Rossi, Kimms & McDowell LLP

(57) ABSTRACT

An image reading system which, even if a user sets a transparent original of a wrong type in order to obtain a preview image, is capable of displaying the preview image which is suited to the type of the transparent original without executing pre-scanning again. When a film original is set on a scanner and an image is read therefrom to display a preview image, reading of the image is carried out by the same reading method irrespective of whether the film original is negative or positive. Image processing for displaying the preview image is changed according to the type of the film selected by the user.

12 Claims, 4 Drawing Sheets

IMAGE READING SYSTEM, IMAGE READING METHOD AND PROGRAM FOR IMPLEMENTING THE METHOD

CROSS REFERENCE TO RELATED APPLICATION

This application claims priority from Japanese Patent Application No. 2003-298912 filed Aug. 22, 2003, which is hereby incorporated by reference herein.

BACKGROUND OF THE INVENTION

1. Field of the Invention

The present invention relates to an image reading system and an image reading method that read an image of an original, and a program for implementing the method.

2. Description of the Related Art

Conventionally, there has been known an image reading apparatus of this kind that has both the function of reading an image (reflective original image) of an original reflected from the original and the function of reading an image (transparent original image) of the original transmitted through the original. The image reading apparatus reads an image of an original according to selected one of the two functions, using an image sensor, to covert the read image into an electric signal, and digitizes the electric signal into digital data using an A/D converter to send the data to an external apparatus. A preview image of an image obtained according to each of the functions is displayed on driver software operating on the external apparatus.

Such an image reading apparatus is capable of reading images from both the originals of a positive film and a negative film, as described e.g. in Japanese Laid-Open Patent Publication (Kokai) No. 2001-144973. However, the positive film and the negative film are quite different in characteristics from each other, and therefore to obtain a preview image, it is necessary to read an image by a reading method suited to the characteristics of the film as the original. There has already been known an image reading apparatus which is capable of reading images of the two different types of films by the respective reading methods suited to the characteristics of the positive film and those of the negative film.

In the conventional image reading apparatus, however, as mentioned above, to obtain a preview image, it is necessary to read an image by a reading method suited to the type (film characteristics) of a film set in the apparatus.

For example, in the case where a user erroneously pre-scans a positive film to display a preview image with the settings suitable for a negative film, the displayed scanned image is excessively bright. Further, the scanned image is converted into a negative image, so that a totally dark preview image is displayed. On the other hand, in the case where a user erroneously pre-scans a negative film with the settings suitable for a positive film, the displayed scanned image has insufficient brightness, and the scanned image is not subjected to negative-to-positive conversion, so that the dark negative image is displayed as it is.

In either of the cases, the user needs to change the settings to a suitable film and then carry out pre-scanning again so as to display a proper preview image, which is troublesome to the user.

SUMMARY OF THE INVENTION

It is an object of the present invention to provide an image reading system and an image reading method, which, even if a user sets a transparent original of a wrong type in order to obtain a preview image, are capable of displaying a preview image which is suited to the type of the transparent original without executing pre-scanning again, and a program for implementing the method.

To attain the above object, in a first aspect of the present invention, there is provided an image reading system comprising an image reading section that reads an image from a transparent original and outputs an image signal indicative of the image, a negative/positive-setting section via which an operator sets a type of the transparent original to be read by the image reading section to a negative original or a positive original, a display section that displays the image read from the transparent original read by the image reading section, an image processing section that subjects the image signal outputted from the image reading section to predetermined image processing, and a control section that always causes the image reading section to read the transparent original according to settings suitable for reading a positive original, irrespective of the type of the transparent original set by the negative/positive-setting section, causes the image processing section to subject the image signal outputted from the image reading section to image processing according to the type of the transparent original set by the negative/positive-setting section, and causes the display section to display an image obtained by the image processing.

With the arrangement of the first aspect of the present invention, even if a user sets a transparent original of a wrong type to obtain a preview image, a preview image can be displayed, which is suited to the type of the transparent original without executing pre-scanning again.

To attain the above object, in a second aspect of the present invention, there is provided an image reading method comprising a negative/positive-setting step of causing an operator to set a type of a transparent original to be read to a negative original or a positive original, an image reading step of always reading an image from the transparent original according to settings suitable for reading a positive original, irrespective of the type of the transparent original set in the negative/positive setting step, and outputting an image signal indicative of the image, an image processing step of subjecting the image signal to image processing according to the type of the transparent original set in the negative/positive-setting step, and a display step of displaying an image obtained by the image processing in the image processing step.

To attain the above object, in a third aspect of the present invention, there is provided a program for causing a computer to execute an image reading method, comprising a negative/positive-setting module for causing an operator to set a type of a transparent original to be read to a negative original or a positive original, an image reading module for always reading an image from the transparent original according to settings suitable for reading a positive original, irrespective of the type of the transparent original set by the negative/positive setting module, and outputting an image signal indicative of the image, an image processing module for subjecting the image signal to image processing according to the type of the transparent original set by the negative/positive-setting module, and a display module for displaying an image obtained by the image processing by the image processing module.

To attain the above object, in a fourth aspect of the present invention, there is provided a computer-readable storage medium storing a program for causing a computer to execute an image reading method, wherein the program comprises a negative/positive-setting module for causing an operator to set a type of a transparent original to be read to a negative original or a positive original, an image reading module for always reading an image from the transparent original according to settings suitable for reading a positive original, irrespective of the type of the transparent original set by the negative/positive setting module, and outputting an image signal indicative of the image, an image processing module for subjecting the image signal to image processing according to the type of the transparent original set by the negative/positive-setting module, and a display module for displaying an image obtained by the image processing by the image processing module.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
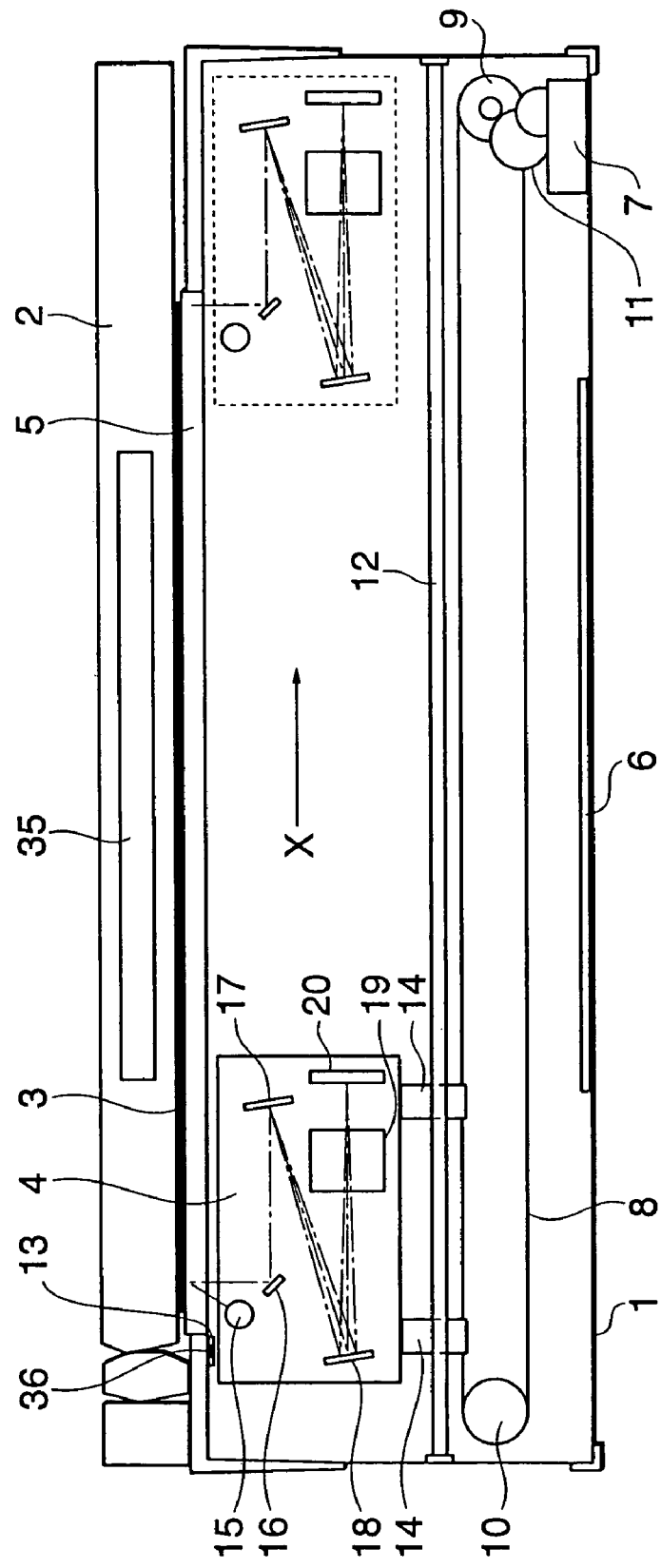
FIG. 1 is a view showing the internal arrangement of a scanner as an image reading apparatus according to an embodiment of the present invention.

FIG. 1 is a view showing the internal arrangement of a scanner as an image reading apparatus according to an embodiment of the present invention. In FIG. 1, reference numeral 1 designates the scanner, 2 a transparent original unit, and 3 an original to be read.

The scanner 1 is connected to a host computer 21 (see FIG. 2) via an interface cable, not shown. The scanner 1 includes a movable optical unit 4, an original platen glass 5, an electric circuit board 6, a pulse motor 7, an endless belt 8, pulleys 9 and 10, a gear train 11, guide rails 12, and a white reference plate 13.

The white reference plate 13 has a black mark 36 thereon, and the scanner 1 determines a reading area with reference to the black mark 36 to thereby read an image. The movable optical unit 4 and the pulse motor 7 are connected to the electric circuit board 6 via respective cables, not shown. The movable optical unit 4 is disposed on base parts 14 disposed for sliding along the guide rails 12. The base parts 14 are fixed to the endless belt 8 stretched around the pulleys 9 and 10, so that the base parts 14 move in a direction indicated by an arrow X (hereinafter referred to as "the direction X") in FIG. 1 in accordance with movement of the endless belt 8. This movement of the base parts 14 shifts the movable optical unit 4 in the direction X. The movable optical unit 4 is comprised of a reflective original light source 15, a plurality of reflecting mirrors 16, 17, and 18, a focusing lens 19, and a line sensor 20 as an image pick-up part. The line sensor 20 is comprised of red (R), green (G), and blue (B) CCDs.

Figure 2:
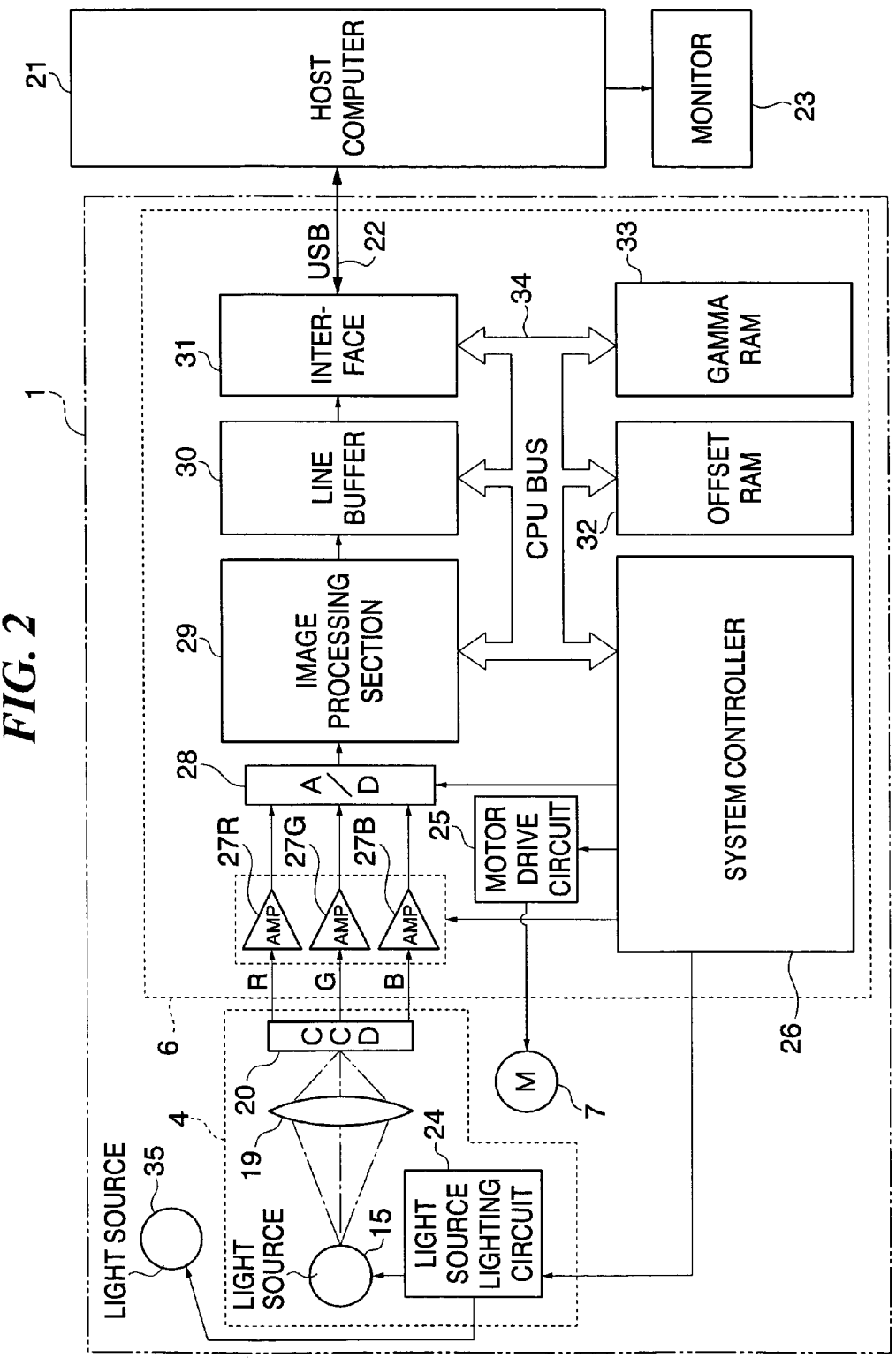
FIG. 2 is a block diagram showing the electrical configuration of the scanner in FIG. 1.

FIG. 2 is a block diagram showing the electrical configuration of the scanner 1. As mentioned above, the scanner 1 is connected to the host computer 21, and the host computer 21 is provided with a monitor 23. The host computer 21 is implemented by a general personal computer (PC) comprised of a CPU, a ROM, and a RAM, which are well known, and other component parts and devices. The monitor 23 is a conventional display unit that can be used as an operating screen of the host computer 21.

Insofar as the electrical configuration is concerned, the scanner 1 includes a light source lighting circuit 24 within the optical unit 4, and the electric circuit board 6. The light source lighting circuit 24 is provided for turning on the reflective original light source 15 and a transparent original light source 35. The light source lighting circuit 24 includes a detector section, not shown, for detecting the amount of light from each light source. The light source lighting circuit 24 switches the light source between the reflective original light source 15 and the transparent original light source 35, depending on the type of the original. When the light sources 15 and 35 are implemented by cold-cathode tubes, the light source lighting circuit 24 is implemented by an inverter circuit.

Referring to the electric circuit board 6, reference numeral 25 designates a motor drive circuit for driving the pulse motor 7, which outputs an excitation-switching signal for the pulse motor 7 in response to a signal from a system controller 26. Reference numeral 27 designates an analog gain adjuster. The analog gain adjuster 27 is comprised of three analog gain amplifiers 27R, 27G, and 27B which are associated with red (R), green (G), and blue (B) colors, respectively, and variably amplify analog image signals outputted from the line sensor 20.

Reference numeral 28 designates an A/D converter for converting the analog image signals outputted from the analog gain adjuster 27 into digital image signals. Reference numeral 29 designates an image processing section that performs image processing, such as offset correction, shading correction, digital gain adjustment, color balance adjustment, masking, resolution conversions in the main and sub scanning directions, and image compression, on the digital image signals from the A/D converter 28.

Reference numeral 30 designates a line buffer for temporarily storing image data. The line buffer 30 is implemented by a general-purpose random access memory. Reference numeral 31 designates an interface section for use in communication with the host computer 21. A USB interface is employed in the present embodiment, but another interface, such as the IEEE 1394, can also be employed.

Reference numeral 32 designates an offset RAM used as a working area for image processing. In the line sensor 20, the CCDs for the respective R, G, and B colors are arranged in parallel with predetermined offsets provided therebetween. Therefore, the offset RAM 32 is used so as to correct the offsets between the RGB CCDs. Further, the offset RAM 32 temporarily stores various kinds of data for shading correction, etc. In the present embodiment, the offset RAM 32 is implemented by a general-purpose random access memory.

Reference numeral 33 designates a gamma RAM that stores gamma curves for gamma correction. Reference numeral 26 designates the system controller that controls the whole sequence of operations of the scanner. The system controller 26 performs various kinds of control operations in response to commands from the host computer 21. Reference numeral 34 designates a system (CPU) bus interconnecting the system controller 26, the image processing section 29, the line buffer 30, the interface section 31, the offset RAM 32, and the gamma RAM 33. The CPU bus 34 is comprised of an address bus and a data bus.

Next, a description will be given of an operation of reading an image on a reflective original, carried out by the scanner 1 constructed as above. The scanner 1 starts a reading operation in response to a read command from the host computer 21. The scanner 1 turns on the reflective original light source 15 of the movable optical unit 4 so that reflected light from the original is sequentially reflected off the plurality of mirrors 16, 17, and 18 to form an image on the sensor 20 via the focusing lens 19, whereby the image is read for one line in the main scanning direction.

Further, the torque of the pulse motor 7 is transmitted to the pulley 9 via the gear train 11 to cause rotation of the pulley 9 for driving the endless belt 8 stretched around the pulleys 9 and 10. The endless belt 8 that is being moved causes the movable optical unit 4 disposed on the base parts 14 fixed to the endless belt 8 to be shifted along the guide rails 12 in the sub scanning direction (i.e. the direction indicated by the arrow X).

The scanner 1 repeatedly carries out the operation of reading a line image in the main scanning direction, while moving the movable optical unit 4 in the sub scanning direction. The scanner 1 moves the movable optical unit 4 to a position indicated by dotted lines in FIG. 1 while repeating the line image reading operation, to thereby achieve scanning over the whole original platen glass 5.

Further, an image can be read from a part of an original on the original platen glass 5 according to a read command from the host computer 21. In this case, an image reading range in the main scanning direction is determined by limiting the range of pixels to be selected from the whole output from the sensor 20, according to an image reading range designated by the host computer 21. On the other hand, an image reading range in the sub scanning direction is determined by limiting the moving range of the movable optical unit 4.

Next, a description will be given of an operation of reading an image on a transparent original, carried out by the scanner 11. The scanner 1 turns off the reflective original light source 15, and turns on the transparent original light source 35. Then, the scanner 1 moves the movable optical unit 4 to a position for reading the transparent original, so that light transmitted through the original is sequentially reflected off the mirrors 16, 17, and 18 to form an image on the sensor 20 via the focusing lens 19, whereby the image is read for one line in the main scanning direction.

Further, similarly to the case of reading a reflective original, the torque of the pulse motor 7 is transmitted to the pulley via the gear train 11 to cause rotation of the pulley 9 for driving the endless belt 8 stretched around the pulleys 9 and 10. The endless belt 8 that is being moved causes the movable optical unit 4 disposed on the base parts 14 fixed to the endless belt 8 to be slid along the guide rails 12 in the sub scanning direction (i.e. the direction indicated by the arrow X).

The scanner 1 repeatedly carries out the operation of reading a line image in the main scanning direction, while moving the movable optical unit 4 in the sub scanning direction. The scanner 1 moves the movable optical unit 4 to the position indicated by the dotted lines in FIG. 1 while repeating the line image reading operation, to thereby achieve scanning over the whole original platen glass 5.

Further, an image can be read from a part of an original on the original platen glass 5 according to a read command from the host computer 21. In this case, the image reading range in the main scanning direction is determined by limiting the range of pixels to be selected from the whole output from the sensor 20, according to an image reading range designated by the host computer 21. On the other hand, the image reading range in the sub scanning direction is determined by limiting the moving range of the movable optical unit 4.

There are several moving speeds preset for selection in moving the movable optical unit 4 in the sub scanning direction. As described in detail hereinafter, the system controller 26 selects an appropriate one of the moving speeds according to read settings designated by the host computer 21, so as to carry out an image reading operation.

Figure 3:
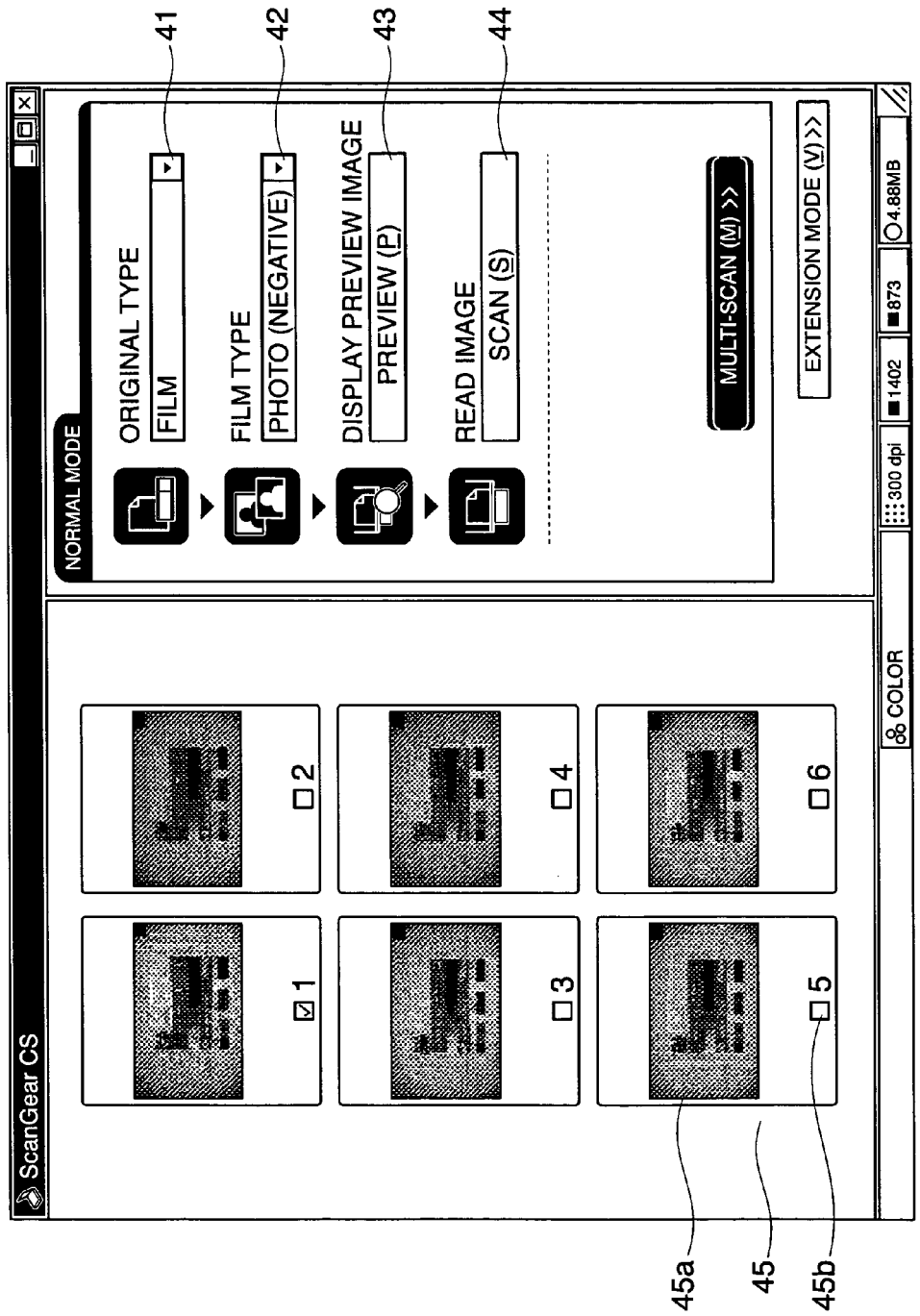
FIG. 3 is a view showing an operating screen displayed on a monitor appearing in FIG. 2.

FIG. 3 is a view showing the operating screen displayed on the monitor 23. The operating screen is started by the host computer 21, and realized by driver software controlling the scanner 1. In FIG. 3, reference numeral 41 designates a selection box for use in selecting a type of originals. When a user selects a type of originals (hereinafter also referred to as the "original type") using this selection box, the image reading method is switched according to the selected original type. To be more specific, the selection is performed from among the reflective original, the transparent original (film original), and so forth. Reference numeral 42 designates a selection box for use in selecting a type of films (hereinafter also referred to as the "film type"), i.e. a negative film or a positive film, when the transparent original (film original) has been selected in the section box 41. The user selects a film type corresponding to the transparent original (film original) to be read into the host computer 21 using this selection box 42.

Reference numeral 43 designates a preview button for use in displaying an image read into the host computer 21 on a preview screen 45. For display operation of the preview screen 45, a temporary or preview image is read (pre-scanned) and subjected to image processing before a proper or final image is read by the host computer 21. The preview screen 45 displays a plurality of thumbnail images 45a and check boxes 45b associated with the respective thumbnail images 45a. Reference numeral 44 designates a reading start button for use in reading the final image into the host computer 21. When this reading start button 44 is depressed, reading of the final image into the host computer 21 is started in a reading manner corresponding to a thumbnail image 45a checked off with a checkmark. On the preview screen 45 in FIG. 3, a plurality of thumbnail images of different objects or a plurality of thumbnail images of the same object subjected to image processing while slightly varying conditions therefor may be displayed.

Figure 4:
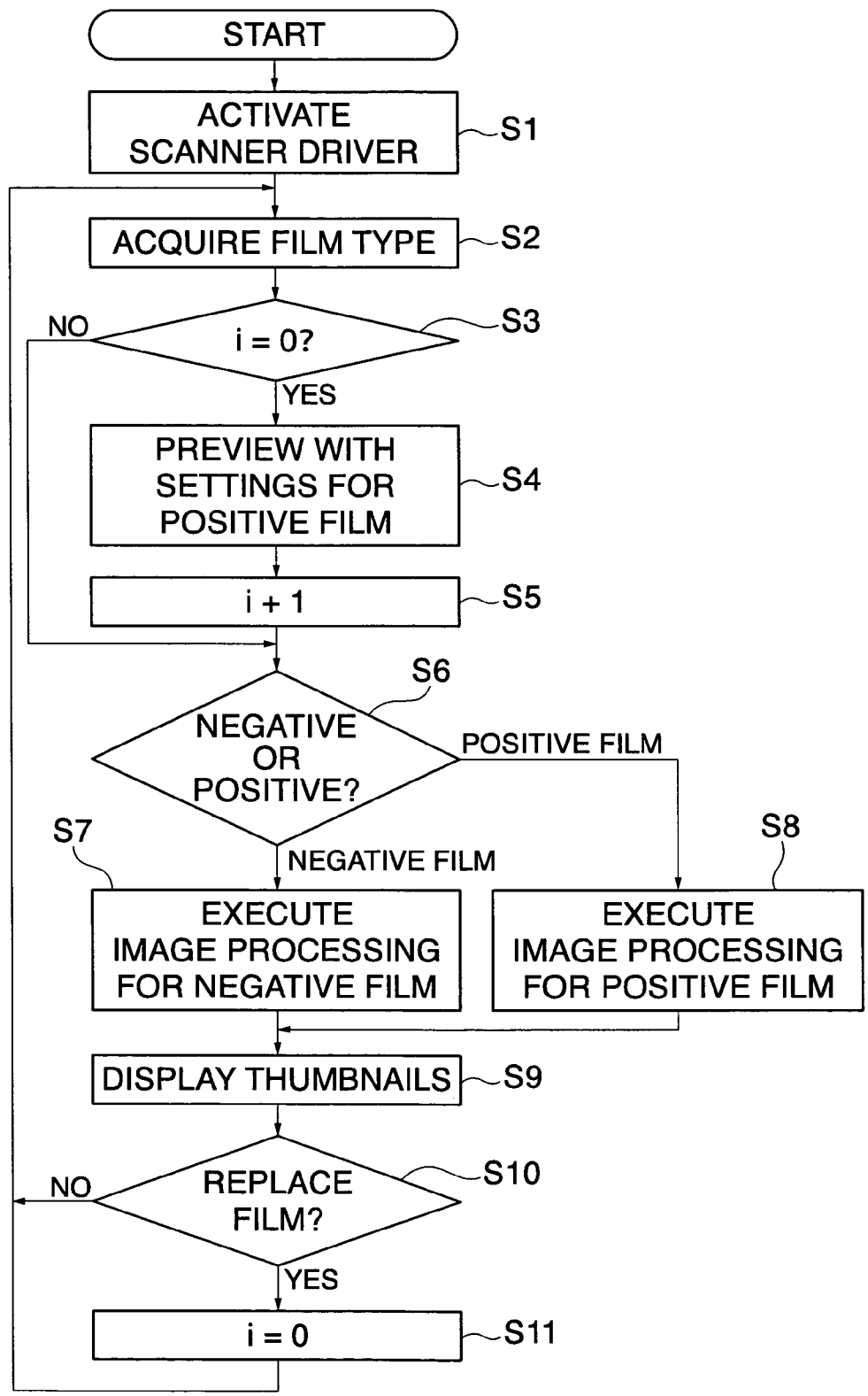
FIG. 4 is a flowchart showing an image reading process.

FIG. 4 is a flowchart showing an image reading process. This process is executed by a CPU, not shown, of the host computer 21 in accordance with a program stored in a storage medium, not shown, of the same.

When the user turns on the power of the scanner 1, a power-on signal is transmitted from the scanner 1 to the host computer 21, and the CPU of the host computer 21 executes the present process by interrupt processing. Further, when the power is turned on, the scanner 1 is initialized whereby settings of the scanner 1 including the setting of a reference position for reading an image are carried out to make the scanner 1 ready for image reading. Then, the driver software for the scanner 1 is activated in the host computer 21 so as to control the scanner 1 (step S1).

When the driver software is activated, the operating screen (see FIG. 3) is displayed on the monitor 23, and the type of a film original selected by the user via the operating screen is acquired (step S2). It is assumed here that the user has set the film original on the original platen glass 5, and the film original has been selected in the selection box 41. Then, it is determined whether or not the selected film original is to be pre-scanned for the first time, i.e. whether or not a reading count i is equal to 0 (step S3).

When the film original is pre-scanned for the first time, the pre-scanning is performed with read settings for a positive film, irrespective of the type of the present film original (step S4). Normally, the system controller 26 sets a motor speed, analog gain values of the RGB colors, and storage time of each CCD, as read settings for a positive film, for film pre-scanning. The system controller 26 controls the motor drive circuit 25 based on the set motor speed, and controls the analog gain adjuster 27 based on the set analog gain values of the RGB colors and the set storage time of each CCD. More specifically, the system controller 26 sets the motor speed to a value corresponding to a resolution of 4096 bits, the analog gain value of the R color to a value corresponding to a resolution of 16384 bits, the analog gain value of the G color to a value corresponding to a resolution of 12288 bits, the analog gain value of the B color to a value corresponding to a resolution of 18192 bits, and the storage time of each of the RGB CCDs to a value corresponding to a resolution of 4096 bits.

Then, when the pre-scanning is completed, the reading count i is incremented by 1 (step S5). Thereafter, the program proceeds to a step S6. On the other hand, if the reading count i is equal to 1 in the step S3, i.e. if any of the second and following previews is designated, the program skips over the steps S4 and S5 to a step S6, wherein it is determined whether the film original selected in the step S2 is a negative film or a positive film.

If the selected film original is a negative film, preview image processing for a negative film is executed (step S7) as follows:

(1) A luminance histogram of preview image data is generated, and a highlight (brightest) point is determined by calculation.

(2) The generated luminance histogram is subjected to density conversion based on a log conversion table to generate a density histogram. An average density and a highlight (upper limit) density are calculated from the generated density histogram.

(3) An average density is calculated back from the highlight density calculated in the step (2).

(4) A more accurate average density is calculated using the average density calculated from the density histogram generated in (2) and the average density calculated back from the highlight density in the step (3).

(5) An amplification factor corresponding to a density corresponding to log0.2 on a γ curve is calculated from the average density calculated in the step (4).

(6) The preview image is processed using a γ curve prepared in advance for negative-to-positive conversion and the amplification factor obtained in the step (5), to thereby generate a histogram.

(7) A highlight point and a shadow (darkest) point are determined by calculation from the histogram generated in the step (6).

(8) The highlight point and the shadow point determined in the step (7) is set to a γ curve for preview image display.

Generally, image data obtained by pre-scanning has a larger image area than the actual effective image area. In the image processing executed in the step S7, a portion other than the effective image area of the preview image is used to acquire data of a negative base film, and image data of the preview image in the effective image area thereof is used to generate a preview image reflecting the characteristics of the negative base film.

On the other hand, if the selected film original is a positive film in the step S6, preview image processing for a positive film is executed (step S8) as follows:

(11) A luminance histogram of preview image data is generated, and a highlight point is determined by calculation.

(12). The generated luminance histogram is subjected to density conversion based on the log conversion table to generate a density histogram. An average density and a highlight density are calculated from the generated density histogram.

(13) An average density is calculated back from the highlight density calculated in the step (12).

(14) A more accurate average density is calculated using the average density calculated from the density histogram generated in the step (12) and the average density calculated back from the highlight density in the step (13).

(15) An amplification factor corresponding to a density corresponding to log0.2 on a γ curve is calculated from the average density calculated in the step (14).

(16) The amplification factor calculated in the step (15) is set to a Y curve for preview image display.

Then, after execution of the image processing for the negative film in the step S7, or after execution of the image processing for the positive film in the step S8, thumbnail images (see FIG. 3) are displayed on the preview screen 45 (step S9).

Thereafter, it is determined whether or not film replacement has been carried out by the user (step S10). If film replacement has been carried out by the user, the reading count i is initialized to 0 (step S11), and the program returns to the step S2, whereafter pre-scanning is executed with the read settings for a positive film as described hereinbefore. If it is determined in the step S10 that film replacement has not been carried out by the user, the program also returns to the step S2. In this case, however, even if a different film type is selected in the step S2, the reading count i is not equal to 0, and therefore the pre-scanning operation is not carried out.

Next, a description will be given of how main scanning conditions are set based on the pre-scanning data. When the selected film original is a negative film, the maximum value in a histogram of image data obtained in the preview is referred to, and the maximum exposure time period is determined based on the maximum value in the histogram. The determined maximum exposure time period is converted into a value that can actually be controlled by the system controller 26, as a provisional CCD storage time, and then a CCD storage time of each of the RGB colors is calculated from the value.

Further, the scanning speed of the motor is determined from the brightness of the preview image. Furthermore, the respective analog gain values of the RGB colors are determined with respect to target values for automatic tinting. In the case of a negative film, some gains remain unset despite the above processing, so that gain gamma is determined so as to absorb the unset gains as gamma. In the case of a positive film, basically the same processing is executed, but calculation of gain gamma is not performed.

As described above, in the present embodiment, the method of reading an image to obtain a preview image is not changed depending on whether a selected film original is a positive film or a negative film, but the preview image is acquired in the same reading method and only image processing for displaying the preview image is changed according to the film type (positive or negative). As a result, even when a user sets a wrong type of film original in the scanner in order to acquire a preview image, a preview image which is suited to the film original can be displayed without executing pre-scanning again. Therefore, the user does not have to carry out troublesome operation for generating a preview image again. Further, the present embodiment makes it possible to suppress an increase in the manufacturing cost without drastically changing the construction of the conventional scanner, as well as to provide users with driver software excellent in operability.

It is to be understood that various modifications and variations will occur to those skilled in the art without departing from the spirit and scope of the invention as hereinafter claimed.

It is to be understood that the object of the present invention may also be accomplished by supplying a system or an apparatus (e.g., a personal computer) with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the program code and the storage medium in which the program code is stored constitute the present invention.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, the above program code has only to realize the functions of the above described embodiment on a computer, and the form of the program may be an object code, a program code executed by an interpreter, or script data supplied to an OS.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network from another computer, a database or the like, not shown, connected to the Internet, a commercial network, a local area network, or the like.

What is claimed is:

1. An image reading system comprising:
   an image reading section that reads an image from a transparent original and outputs an image signal indicative of the image;
   a negative/positive-setting section via which an operator sets a type of the transparent original to be read by said image reading section to a negative original or a positive original;
   a display section that displays the image read from the transparent original read by said image reading section;
   an image processing section that subjects the image signal outputted from said image reading section to predetermined image processing; and
   a control section that always causes said image reading section to read the transparent original according to settings suitable for reading a positive original, irrespective of the type of the transparent original set by said negative/positive-setting section, causes said image processing section to subject the image signal outputted from said image reading section to image processing according to the type of the transparent original set by said negative/positive-setting section, and causes said display section to display an image obtained by the image processing.

2. An image reading system as claimed in claim 1, wherein said image processing section has a capability of performing negative-to-positive conversion of an image.

3. An image reading system as claimed in claim 1, further comprising a storage section that stores the image signal indicative of the image read from the read transparent original, and
   wherein said control section is responsive to change of the setting of the type of the transparent original by said negative/positive-setting section after the image is displayed by said display section, for causing said image processing section to subject the image signal stored in said storage section to image processing according to the changed setting of the type of the transparent original, and causing said display section to display an image obtained by the image processing.

4. An image reading method comprising:
   a negative/positive-setting step of causing an operator to set a type of a transparent original to be read to a negative original or a positive original;
   an image reading step of always reading an image from the transparent original according to settings suitable for reading a positive original, irrespective of the type of the transparent original set in said negative/positive setting step, and outputting an image signal indicative of the image;
   an image processing step of subjecting the image signal to image processing according to the type of the transparent original set in said negative/positive-setting step; and
   a display step of displaying an image obtained by the image processing in said image processing step.

5. An image reading method as claimed in claim 4, wherein the image processing in said image processing step comprises negative-to-positive conversion of an image.

6. An image reading method as claimed in claim 4, further comprising a storage step of storing the image signal indicative of the image read from the read transparent original, and
   wherein when the setting of the type of the transparent original is changed in said negative/positive-setting step after the image is displayed in said display step, the image signal stored in said storage step is subjected to image processing in said image processing step, according to the changed setting in said negative/positive-setting step, and an image obtained by the image processing is displayed in said display step.

7. A program for causing a computer to execute an image reading method, comprising:
   a negative/positive-setting module for causing an operator to set a type of a transparent original to be read to a negative original or a positive original;
   an image reading module for always reading an image from the transparent original according to settings suitable for reading a positive original, irrespective of the type of the transparent original set by said negative/positive setting module, and outputting an image signal indicative of the image;
   an image processing module for subjecting the image signal to image processing according to the type of the transparent original set by said negative/positive-setting module; and
   a display module for displaying an image obtained by the image processing by said image processing module.

8. A program as claimed in claim 7, wherein the image processing by said image processing module comprises negative-to-positive conversion of an image.

9. A program as claimed in claim 7, further comprising a storage module for storing the image signal indicative of the image read from the read transparent original, and wherein when the setting of the type of the transparent original is changed by said negative/positive-setting module after the image is displayed by said display module, the image signal stored in said storage module is subjected to image processing by said image processing module, according to the changed setting by said negative/positive-setting module, and an image obtained by the image processing is displayed by said display module.

10. A computer-readable storage medium storing a program for causing a computer to execute an image reading method, wherein the program comprises:

a negative/positive-setting module for causing an operator to set a type of a transparent original to be read to a negative original or a positive original;

an image reading module for always reading an image from the transparent original according to settings suitable for reading a positive original, irrespective of the type of the transparent original set by said negative/positive setting module, and outputting an image signal indicative of the image;

an image processing module for subjecting the image signal to image processing according to the type of the transparent original set by said negative/positive-setting module; and a display module for displaying an image obtained by the image processing by said image processing module.

11. A computer-readable storage medium as claimed in claim 10, wherein the image processing by said image processing module comprises negative-to-positive conversion of an image.

12. A computer-readable storage medium as claimed in claim 10, further comprising a storage module for storing the image signal indicative of the image read from the read transparent original, and wherein when the setting of the type of the transparent original is changed by said negative/positive-setting module after the image is displayed by said display module, the image signal stored by said storage module is subjected to image processing by said image processing module, according to the changed setting by said negative/positive-setting module, and an image obtained by the image processing is displayed by said display module.

* * * * *